US007995135B2

(12) United States Patent
Uezono

(10) Patent No.: US 7,995,135 B2
(45) Date of Patent: Aug. 9, 2011

(54) IMAGE CAPTURING APPARATUS FOR ADJUSTING AN EXPOSURE VALUE THAT IS SET LOWER THAN THE CORRECT EXPOSURE VALUE

(75) Inventor: Tetsuji Uezono, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 618 days.

(21) Appl. No.: 12/053,654

(22) Filed: Mar. 24, 2008

(65) Prior Publication Data

US 2009/0167891 A1    Jul. 2, 2009

(30) Foreign Application Priority Data

Dec. 27, 2007   (JP) ................. 2007-335469

(51) Int. Cl.
*H04N 9/73*   (2006.01)
*H04N 9/64*   (2006.01)
*H04N 5/202*  (2006.01)
*H04N 5/235*  (2006.01)
*G03B 7/00*   (2006.01)

(52) U.S. Cl. ............ 348/362; 348/225.1; 348/242; 348/254

(58) Field of Classification Search .......... 348/222.1, 348/223.1, 225.1, 229.1, 241, 242, 251, 254–6, 348/362; 382/167, 169, 274
See application file for complete search history.

(56) References Cited

U.S. PATENT DOCUMENTS 7,190,829 B2 * 3/2007 Zhang et al. .............. 382/165
2007/0013782 A1   1/2007 Kobayashi
2007/0070214 A1 * 3/2007 Nakamura .............. 348/222.1

FOREIGN PATENT DOCUMENTS

JP    2007027967    2/2007

OTHER PUBLICATIONS

"Comparison of Retinex Models for Hardware Implementation" by Nosato et al., IEICE Technical Report, SIS, 2005-16, pp. 19-24 (Jun. 2005).

* cited by examiner

*Primary Examiner* — Sinh Tran
*Assistant Examiner* — Daniel M Pasiewicz
(74) *Attorney, Agent, or Firm* — Peter P. Hernandez; Peyton C. Watkins

(57) ABSTRACT

In an image capturing apparatus, a hue shift is prevented. A digital camera has a gray level correction function. Image data obtained with a CCD 10 is divided into a plurality of blocks and further has brightness data and color difference data converted in a brightness/color difference conversion section 20. When it is determined, based on the color difference data, that image data includes blue sky image or that chroma of the image data is high, an image processing exposure compensation adjustment/exposure correction amount calculation section 30 sets an underexposure value, which is employed when capturing images with an exposure value being lower than a correct exposure value, to be smaller than a default value to prevent a hue shift caused by gray level correction performed by a gray level correction section 32.

2 Claims, 2 Drawing Sheets

IMAGE CAPTURING APPARATUS FOR ADJUSTING AN EXPOSURE VALUE THAT IS SET LOWER THAN THE CORRECT EXPOSURE VALUE

CROSS REFERENCE TO RELATED APPLICATIONS

This application claims priority to Japanese Patent Application No. 2007-335469 filed on Dec. 27, 2007, which is incorporated herein by reference in its entirety.

FIELD OF THE INVENTION

The present invention relates to an image capturing apparatus, and more particularly to elimination of hue shift.

BACKGROUND OF THE INVENTION

Gray level correction for correcting brightness and contrast in an image which is captured under an illumination condition such as a condition where a subject is photographed against the light is known, and gamma correction and histogram correction are typical examples of the gray level correction. With gamma correction and histogram correction, however, as image correction is performed using a fixed coefficient, problems of an image being white due to overexposure and an image being black due to underexposure arise.

On the other hand, adaptive gray level correction (adaptive enhancement) in which, in addition to the gray level value of image data, information concerning pixels adjacent to a pixel to be corrected is used to determine correction coefficients has been proposed, and with this technology, correction in accordance with the content of an image can be achieved. The adaptive gray level correction is disclosed in "Comparison of Retinex Models for Hardware Implementation" by Nosato et al., IEICE technical report, SIS, 2005-16, pp. 19-24 (June, 2005). The adaptive gray level correction is based on Retinex theory, in which assuming that an input image is represented by a product of illumination light and reflectivity, illumination light is separated from an input image to thereby obtain a reflectivity image as a correction image. Provided that an input image I is represented as an input image I=illumination light L×reflectivity R (correction image), the relationship of R (x, y)=exp {log(I(x,y))−log(L(x,y))} can be achieved. Calculus of variation is used to estimate the illumination light, and a plurality of layers k with a resolution which is $\frac{1}{2}^k$ that of the original image are generated, and calculation for updating the illumination light is repeated starting from a layer with a lower resolution. Here, the calculation for updating the illumination light is performed by using the expression of L (x, y)=L (x, y)−μNSD×G(x, y), wherein G(x, y) is a gradient of cost function and μNSD is learning coefficient. Specifically, processing in which G(x, y) is first calculated, and μNSD(x, y) is then calculated, and based on these calculation results, L(x, y) is calculated, is repeated.

Further, JP2008-27967A discloses that when a person photographing mode is selected, an image is captured with the exposure value being set to a value under an appropriate exposure value computed by an AE (Automatic Exposure) detector, and gray level correction is applied to image data obtained by image capturing by using a γ transform table for increasing the dynamic range of image data which has been subjected to gray level conversion processing, thereby correcting the brightness value of portions of the image with insufficient brightness which are located in the vicinity of the center of the subject.

As described above, problems of an image being white due to overexposure and an image being black due to underexposure can be prevented by capturing an image of a subject with the exposure value being set under the appropriate exposure value which is set by AE and adaptively performing gray level correction with respect to the resulting image data. With this method, however, certain image data may suffer from hue shift caused by the gray level correction, resulting in a disadvantage that an image desired by a user cannot be obtained. For example, when adaptive gray level correction is performed with respect to image data obtained by capturing an image with the exposure value being set lower than the appropriate exposure value by 0.5 EV, an image of blue sky which existed in the original image data prior to the gray level correction becomes unclear. Further, if the original image data prior to the gray level correction includes an image of flowers with an orange color, the color of the flowers becomes yellowish as a result of the gray level correction.

SUMMARY OF THE INVENTION

The present invention advantageously provides an image capturing apparatus which can prevent hue shift to thereby provide an image with a hue desired by a user, when adaptive gray level correction is performed with respect to image data obtained by photographing a subject with an exposure value being set under an appropriate exposure value.

In accordance with an aspect of the present invention, there is provided an image capturing apparatus for capturing an image of a subject comprising exposure control means which calculates a correct exposure value, image correction means which applies gray level correction to image data of an image captured with an exposure value being set lower than the correct exposure value, and adjustment means which adjusts an exposure value which is to be set lower than the correct exposure value by determining whether or not color data of the image data prior to the gray level correction performed by the image correction means satisfies a particular condition.

In accordance with another aspect of the invention, the adjustment means provides data concerning an amount of adjustment to the image correction means, and the image correction means uses the data concerning an amount of adjustment to adjust a correction amount.

In accordance with still another aspect of the invention, the adjustment means sets the exposure value which is to be set lower than the correct exposure value to a value whose amount of the exposure compensation is smaller than a default value, when the image data includes image data of blue sky, when a chroma value of the image data is equal to or greater than a threshold value, when color data of the image data is saturated, or when the number of regions in the image data with chromaticity within a specific range is equal to or greater than a threshold value.

In accordance with a further aspect of the present invention, the image correction means sets the correction amount to a value which is smaller than a default value.

With present invention, it is possible to prevent hue shift to thereby provide an image with a hue desired by a user, when adaptive gray level correction is performed with respect to image data obtained by photographing with an exposure value being set to a value which is under an appropriate exposure value.

BRIEF DESCRIPTION OF THE DRAWINGS

A preferred embodiment of the present invention will be described in detail based on the following figures, wherein.

DETAILED DESCRIPTION OF THE INVENTION

A preferred embodiment of the present invention, in which a digital camera is provided as an image capturing apparatus as an example, will be described in detail with reference to the accompanying drawings.

Figure 1:
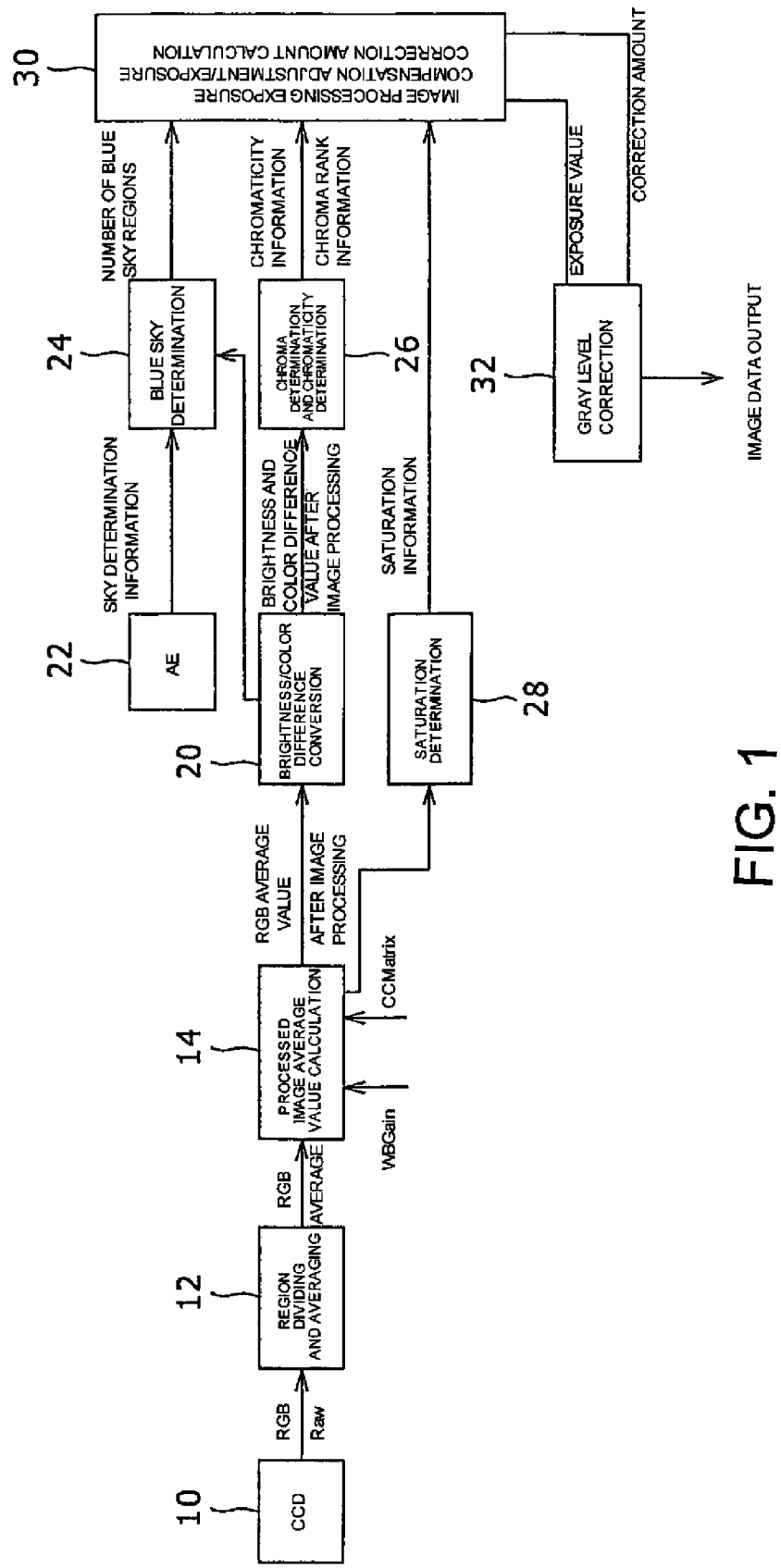
FIG. 1 is a block diagram showing functions of an embodiment according to the present invention.

FIG. 1 is a block diagram showing functions of a digital camera according to an embodiment of the present invention. In the present embodiment, structures of optics for forming an image of a subject on an image capturing element, means which performs correlated double sampling with respect to an image signal supplied from the image capturing element and a means which converts the image signal into a digital signal, means which compresses or extends image data, means which generates a preview image, means which displays the preview image and a captured image on a display device, means which records the image data on a recording medium, auto focus (AF) means, automatic exposure control (AE) means, white balance (WB) processing means, and so on, are the same as those of known digital cameras, and will therefore not be described.

Referring to FIG. 1, a CCD 10, serving as an image capturing element, outputs R, G, and B signals. It should be noted that the image capturing element is not limited to a CCD, and may be a CMOS.

A region dividing and averaging section 12 divides preview image data obtained by the CCD 10 into a plurality of regions or blocks, and calculates and outputs an average pixel value for each region. More specifically, the region dividing and averaging section 12 divides the whole image data into n×m rectangular regions and calculates a simple average of R, G, and B pixel values for each region. In this case, a saturated pixel value is similarly included for the average calculation.

A processed image average value calculation section 14, using parameters which are used for performing predetermined image processing such as white balance processing and color correction processing, e.g. parameters including a white balance gain (WB gain), a color correction matrix (CC-Matrix), and so on, calculates and outputs, for each region, an average pixel value after image processing. Specifically, the processed image average value calculation section 14 multiplies the average value calculated by the region dividing and averaging section 12 by a white balance gain and a color correction matrix. Here, if the R, G, and B values are compressed by using a predetermined function, an inverse function thereof is used to extend the R, G, and B values, and the extended R, G, and B values are then multiplied by a white balance gain and a color correction matrix.

A brightness/color difference conversion section 20 converts the average values output from the processed image average value calculation section 14 into brightness data and color difference data. More specifically, the R, G, and B values are converted using the following equation:

$$\begin{pmatrix} L \\ Mgr \\ Bam \end{pmatrix} = \begin{pmatrix} 0.25 & 0.5 & 0.25 \\ -0.25 & 0.5 & -0.25 \\ 0.5 & 0 & -0.5 \end{pmatrix} \begin{pmatrix} R \\ G \\ B \end{pmatrix}$$ (Equation 1)

Figure 2:
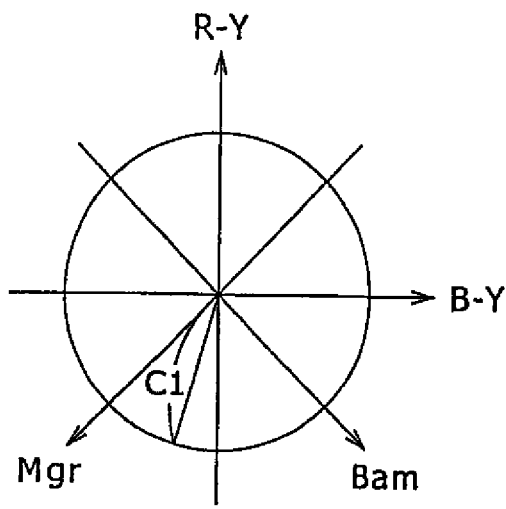
FIG. 2 is an explanatory view for a chroma determination criterion according to the embodiment of the present invention.

Here, Bam and Mgr represent blue amber and magenta green, respectively, and are in a relationship shown in FIG. 2 in a brightness/color difference plane including B-Y and R-Y as orthogonal axes.

A chroma (chroma saturation) determination/chromaticity determination section 26 determines chroma and chromaticity of the divided regions. Here, the chroma is represented by a moving radius of chromaticity data (Mgr, Bam), i.e. as chroma $C=(Mgr^2+Bam^2)^{0.5}$. The chroma is determined as two levels, i.e. low chroma and high chroma. Specifically, low chroma is determined when $C \leq C1$, and high chroma is determined when $C \geq C1$, wherein C1 is a predetermined threshold value. The chroma determination/chromaticity determination section 26 counts and outputs the number of regions for which high chroma is determined. Here, the number of regions for which high chroma is determined is represented by numBlockHiChoroma.

Figure 3:
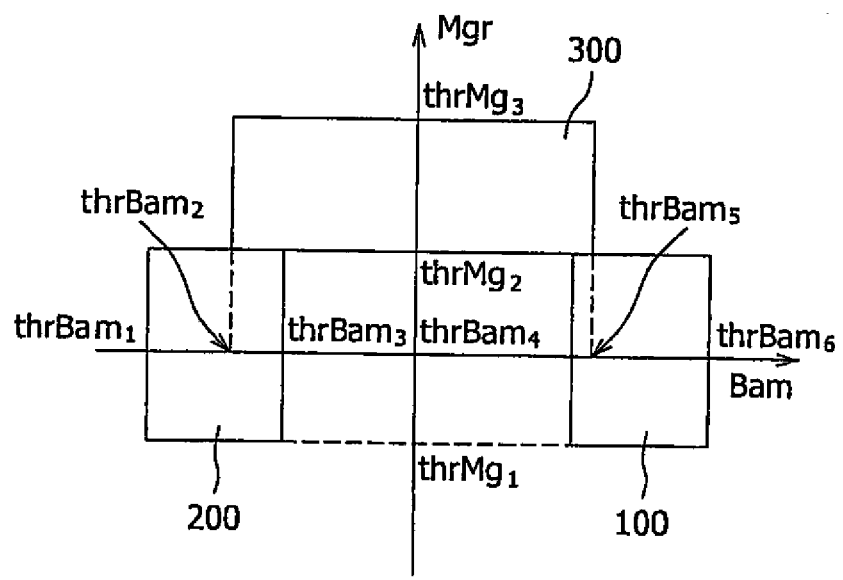
FIG. 3 is an explanatory view for a chromaticity determination criterion according to the embodiment of the present invention.

Further, the chroma determination/chromaticity determination section 26 counts the number of regions for which low chroma is determined and simultaneously chromaticity data (Mgr, Bam) is present in three specific regions 100, 200, and 300 shown in FIG. 3. Here, the number of regions for which the chromaticity data is present in either one of the regions 100, 200, and 300 is represented by numBlockMidchroma. Specifically, the region 100 is a region in which a relationship of thrB4<Bam<thrB6 is satisfied and simultaneously a relationship of thrM1<Mgr<thrM2 is satisfied; the region 200 is a region in which a relationship of thrB1<Bam<thrB3 is satisfied and simultaneously a relationship of thrM1<Mg<thrM2 is satisfied; and the region 300 is a region in which a relationship of thrB2<Ban<thrB5 is satisfied and simultaneously a relationship of thrM2<Mgr<thrM3 is satisfied, wherein thrB<thrB2<thrB3<thrB4<thrB5 and thrM1<thrI2<thrM3.

An AE control section 22 outputs a determination result concerning whether or not a sky image is included in image data.

Figure 4:
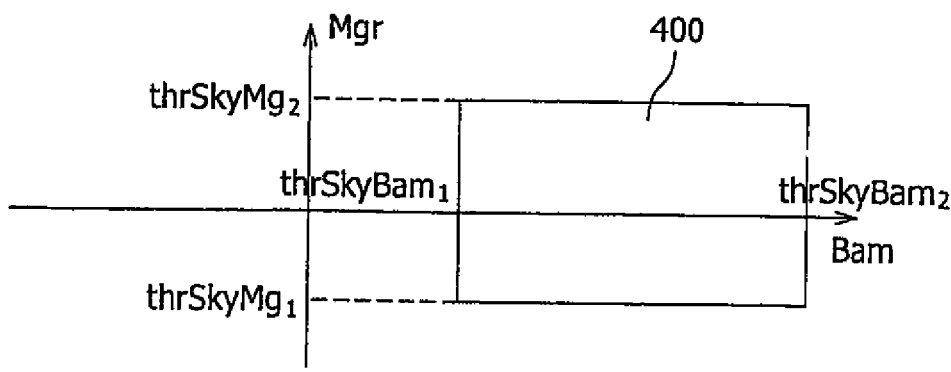
FIG. 4 is an explanatory view for a blue sky image determination criterion according to the embodiment of the present invention.

A blue sky determination section 24 determines whether or not a blue sky image is included in the image data based on the determination result supplied from the AE control section 22 and the color difference data B output from the brightness/color difference conversion section 20. More specifically, the blue sky determination section 24 determines the image data of a certain region includes blue sky image data if the AE control section 22 determines that the sky image is included and simultaneously the color difference data (Mgr, Bam) of that region satisfies the following conditions, as shown in FIG. 4:

thrskyM1<Mgr<thrskyM2 threskyB<Bam wherein thrskyM1, thrskyM2, thrskyB are predetermined threshold values, respectively. In other words, a blue sky image is determined if the color difference data Bam exceeds the threshold value and the color difference data Mgr falls within a predetermined region 400. The blue sky determination section 24 counts and outputs the number of regions which are determined to include a blue sky image. The number of such regions is represented by numBlockSky.

A saturation determination section 28 determines, based on the R, G, and B values of each region supplied from the processed image average value calculation section 14, whether or not the color data is saturated. More specifically, the saturation determination section 28 determines that a pixel is not saturated when the R, &, and B values fall in a range between 0 and 255 and determines that the pixel is saturated when the R, G, and B values have other values. The saturation determination section 28 further counts and outputs the number of regions for which saturation is determined. Here, the number of saturated regions is represented by numBlockSat.

An image processing and exposure compensation adjustment/exposure correction amount calculation section 30 estimates, based on the count result numBlockSky from the blue sky determination section 24, the count result numBlockHichroma and numBlockMidChroma output from the chroma determination/chromaticity determination section 26, and the count result numBlockSat from the saturation determination section 28, a correction result which is to be obtained if the adaptive gray level correction is performed, and, if hue shift is expected as a result of the adaptive gray level correction, calculates an exposure correction amount and also adjusts a correction amount. Specifically, when an image is captured with an exposure value being set lower than a correct exposure value which has been set by the AE control section 22 and then adaptive gray level correction is performed by the gray level correction means with respect to image data obtained by image capturing and the resultant image data is to be output, the image processing and exposure compensation adjustment/exposure correction amount calculation section 30 changes an exposure value which is set lower than the correct exposure value (which will be referred to as an "underexposure value") and further changes the correction amount in the gray level correction section 32. In general, the underexposure value is set to 0.5 EV, for example, and the correction amount in the gray level correction section 32 is also fixed. The image processing and exposure compensation adjustment/exposure correction amount calculation section 30 changes the predetermined underexposure value and the predetermined correction amount based on the count results. More specifically, the image processing and exposure compensation adjustment/exposure correction amount calculation section 30, determining that at least one of the conditions is satisfied including that image data is saturated, that chroma of image data is high, that chromaticity of image data falls within a specific range, and that image data includes blue sky image, assumes that correction to be performed by the gray level correction section 32 will cause hue shift, and therefore adjusts the underexposure value and the correction amount. Here, the image processing and exposure compensation adjustment/exposure correction amount calculation section 30 may adjust only the underexposure value or may adjust both the underexposure value and the correction amount.

It is assumed, for example, that a default underexposure value is 0.5 EV. In other words, it is assumed that image capturing is performed with exposure correction to set the exposure value to be lower than the appropriate exposure value by 0.5 EV. At this time, the image processing and exposure compensation adjustment/exposure correction amount calculation section 30 compares the count result numBlockSky of the blue sky determination section 24 with the threshold value, and if the count result numBlockSky exceeds the threshold value, determines that the image data includes a large region of blue sky image and therefore determines that a user wishes to reproduce the color of blue sky on a clear and sunny day. The image processing and exposure compensation adjustment/exposure correction amount calculation section 30 then changes the underexposure value from 0.5 EV, which is a default value, to 0.3 EV, thereby decreasing the underexposure value with respect to the default value. With the decrease in the underexposure value with respect to the default value, the correction amount in the gray level correction section 32 also decreases accordingly, which further results in suppression of hue shift caused by the gray level correction, because the gray level correction section 32 performs gray level correction so as to compensate for an image captured with the exposure being set under the appropriate exposure by an correction amount corresponding to the amount of underexposure. Here, the image processing and exposure compensation adjustment/exposure correction amount calculation section 30 may further determine whether or not a person's face is detected and set the underexposure value to be smaller than the default value if the count result numBlockSky of the blue sky determination section 24 exceeds the threshold value and simultaneously a person's face is not detected. Such a determination is made based on the assumption that it is highly likely that, when a person's face is detected, a user will place more emphasis on the contrast of a person's face than on the blue color of the sky image.

Further, the image processing and exposure compensation adjustment/exposure correction amount calculation section 30 compares the count result numBlockHiChroma of the chroma determination/chromaticity determination section 26 with a threshold value, i.e. 0, and when the count result is greater than 0, changes the underexposure value to 0.3 EV to thereby set the underexposure value to be smaller than the default value. Also, the image processing and exposure compensation adjustment/exposure correction amount calculation section 30 compares the count result numBlockSat of the saturation determination section 28 with a threshold value, i.e. 0, and when the count result is greater than 0, changes the underexposure value to 0.3 EV to thereby set the underexposure value to be smaller than the default value. In addition, the image processing and exposure compensation adjustment/exposure correction amount calculation section 30 compares the count result numBlockMidChroma of the chroma determination/chromaticity determination section 26 with a threshold value, and when the count result is equal to or above a certain threshold value with respect to the whole image data, changes the underexposure value to 0.3 EV to thereby set the underexposure value to be smaller than the default value.

Also, when chroma of an image is high, and more specifically, when the number of blocks with high chroma, numBlockHiChroma, exceeds 0, or when the number of saturated blocks, numBlockSat, exceeds 0, or when the number of blocks having chromaticity in a specified range, numBlockMidChroma, exceeds the threshold value, the image processing and exposure compensation adjustment/exposure correction amount calculation section 30 changes the underexposure value to 0.3 EV to thereby set the underexposure value to be smaller than the default value, and also decreases the correction amount in the gray level correction section 32. As an excess correction amount in the gray level correction section 32 may cause hue shift as described above, the correction amount in the gray level correction section 32, in addition to the underexposure value, is simultaneously reduced when the image includes high chroma data, so that hue shift can be effectively prevented.

The gray level correction section 32 applies adaptive gray level correction to the image data which is obtained by image capturing with the exposure value being set under the appropriate value, and outputs the corrected image data. Here, arbitrary gray level correction methods may be employed for applying γ transform to the brightness data by using an adaptive γ function and also correcting the color difference data, thereby performing gray level correction. As the gray level correction section 32 performs gray level correction such that exposure of the image data captured with the exposure value under the appropriate exposure value is compensated for, to thereby achieve the appropriate exposure, a correction amount for the gray level correction is reduced when the exposure correction amount is small, whereas the correction amount for the gray level correction is increased when the exposure correction amount is large, in which case effects of the gray level correction appear in a noticeable manner (i.e. distortion due to the gray level correction appears in a noticeable manner). Here, as the correction amount in the gray level correction section 32 is set such that the gray level correction section 32 compensates for the exposure by an amount corresponding to the amount of exposure under the appropriate exposure value, the image processing and exposure compensation adjustment/exposure correction amount calculation section 30 instructs the gray level correction section 32 to suppress the correction amount in the gray level correction section 32. More specifically, while, in a default state, the correction amount for the gray level correction in the gray level correction section 32 is set such that the image captured with the underexposure value of 0.5 EV is compensated for by the correction amount corresponding to this underexposure value (0.5 EV) (the correction amount determined in such a default state will be referred to as a "default correction amount), when an underexposure value (corresponding to the "exposure value" in FIG. 1) and an instruction to change the correction amount (corresponding to the "correction amount" in FIG. 1) are supplied from the image processing and exposure compensation adjustment/exposure correction amount calculation section 30, the correction amount for the gray level correction is changed to be smaller than the default correction amount, in accordance with this instruction. The change in the correction amount can be achieved by changing the γ function (i.e, by making the γ function more linear). Here, as the color difference data is corrected in addition to γ transform of the brightness data, it is desirable to similarly make the correction function for correcting the color difference data more linear along with the change of the γ function toward more linear side, when reducing the correction amount. The blue sky determination section 24, the chroma determination/chromaticity determination section 26, the saturation determination section 28, and the image processing and exposure compensation adjustment/exposure correction amount calculation section 30 can be formed by a CPU, and the gray level correction section 32 can be formed by a dedicated DSP.

As described above, according to the present embodiment, (1) whether or not image data includes a blue sky image region;
(2) whether or not color data of image data is saturated;
(3) whether or not the chroma of image data is high; and
(4) whether or not chromaticity of image data is in a specific range, is determined, and if any one of the above conditions is satisfied, the underexposure value which is determined when photographing a subject with the exposure value being set under the appropriate exposure value set by the AE control section 22 is set smaller than the default value, or the underexposure value is set to be smaller than the default value and also the gray level correction amount is set to a small amount, so that hue shift can be prevented. Here, the gray level correction amount being set to a small amount will be described in more detail. Specifically, the gray level correction amount is determined in accordance with the underexposure value in such a manner that the smaller the underexposure value, the smaller the gray level correction amount accordingly, and assuming that the gray level correction amount determined in accordance with the underexposure value is a default correction value, the gray level correction amount being set to a small amount refers to the fact that the gray level correction amount is set to an even smaller value than this default value (i.e. the gray level correction is suppressed). The present applicant has confirmed that, with the processing method according to the present embodiment, the blue color of the sky in a captured blue sky image becomes more natural and flowers have more natural colors.

In the present embodiment, the priority order of the above four conditions can be appropriately set, or these four conditions can be appropriately combined. For example, by placing higher priority on the condition (1), whether or not blue sky data is included in the image data is first determined, and if the blue sky image is included, the underexposure value is set to a small value, and so on.

While in the present embodiment the default value of the underexposure value is set to 0.5 EV, which is changed to 0.3 EV if any one of the above conditions (1) to (4) is satisfied, this example has been described for the purpose of illustration only. Alternatively, the underexposure value can be set to an arbitrary value, such as 0.2 EV, 0.4 EV, and so on.

While the preferred embodiment of the present invention has been described using specific terms, such description is for illustrative purposes only, and it is to be understood that changes and variations may be made without departing from the spirit or scope of the appended claims.

PARTS LIST

10 CCD
12 averaging section
14 calculation section
20 conversion section
22 AE control section
24 blue sky determination section
26 chroma determination section
28 saturation determination section
30 calculation section
32 gray level correction section
100 region
200 region
300 region
400 predetermined section

What is claimed is:

1. An image capturing apparatus for capturing an image of a subject, comprising:
   exposure control means which calculates a correct exposure value;
   image correction means which applies gray level correction to image data of an image captured with an exposure value being set lower than the correct exposure value; and
   adjustment means which adjusts an exposure value which is to be set lower than the correct exposure value by determining whether or not color data of the image data prior to the gray level correction performed by the image correction means satisfies a particular condition;
   wherein the adjustment means provides data concerning an amount of adjustment to the image correction means, and the image correction means uses the data concerning an amount of adjustment to adjust a correction amount; and
   wherein blue sky image data in the image data causes the adjustment means to set the exposure value which is to be set lower than the correct exposure value to a value whose amount of the exposure compensation is smaller than a default value.

2. An image capturing apparatus for capturing an image of a subject, comprising:

exposure control means which calculates a correct exposure value;

image correction means which applies gray level correction to image data of an image captured with an exposure value being set lower than the correct exposure value; and adjustment means which adjusts an exposure value which is to be set lower than the correct exposure value by determining whether or not color data of the image data prior to the gray level correction performed by the image correction means satisfies a particular condition;

wherein the adjustment means provides data concerning an amount of adjustment to the image correction means, and the image correction means uses the data concerning an amount of adjustment to adjust a correction amount; and wherein saturated color data of the image data causes the adjustment means to set the exposure value which is to be set lower than the correct exposure value to a value whose amount of the exposure compensation is smaller than a default value.

* * * * *